(12) United States Patent
Singh (10) Patent No.: US 7,133,997 B2
(45) Date of Patent: Nov. 7, 2006

(54) CONFIGURABLE CACHE

(75) Inventor: Manish Singh, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 10/743,162

(22) Filed: Dec. 22, 2003

(65) Prior Publication Data

US 2005/0138293 A1 Jun. 23, 2005

(51) Int. Cl.
*G06F 12/00* (2006.01)
(52) U.S. Cl. .................. 711/218; 711/118; 711/130
(58) Field of Classification Search ............. None
See application file for complete search history.

(56) References Cited

U.S. PATENT DOCUMENTS

| | | | | |
|---|---|---|---|---|
| 4,503,501 A | * | 3/1985 | Coulson et al. | 711/129 |
| 4,788,656 A | * | 11/1988 | Sternberger | 710/52 |
| 5,367,653 A | * | 11/1994 | Coyle et al. | 711/128 |

* cited by examiner

*Primary Examiner*—T Nguyen
(74) *Attorney, Agent, or Firm*—Buckley, Maschoff & Talwalkar LLC (57) ABSTRACT

A method, apparatus, and system for configuring an address bit in a cache formed on an integrated circuit. The method, apparatus, and system include the ability to configure the address bit as either a tag bit or a set index bit and reconfigure the address bit.

26 Claims, 6 Drawing Sheets

Cache Configuration Device

System

Figure 6

CONFIGURABLE CACHE

BACKGROUND

Cache is memory that is generally near in proximity to a processor. At least in part, the proximity of the cache to the processor makes access to the cache by the processor faster than processor access to other types of memory, such as RAM or hard drives. Cache often holds data that has recently been accessed or that is anticipated to be needed. For example, when used with a network router, cache may hold addresses of destination nodes to which packets have been sent recently in the expectation that additional packets may be routed to those nodes in the near future and so those addresses will be easily accessible.

Cache typically has a variety of attributes including associativity, a number of sets used, cache line size and cache size. Certain of those attributes may be related to data storage, while other of those attributes may be used to define a location in the cache, known as a cache address, where the data is stored. Those attributes are furthermore typically set in hardware at the time of manufacturing.

BRIEF DESCRIPTION OF THE DRAWINGS

The accompanying drawings, wherein like reference numerals are employed to designate like components, are included to provide a further understanding of configurable cache, are incorporated in and constitute a part of this specification, and illustrate embodiments of configurable cache that together with the description serve to explain the principles of configurable cache.

In the drawings.

DETAILED DESCRIPTION

Reference will now be made to embodiments of configurable cache, examples of which are illustrated in the accompanying drawings. Moreover, those of ordinary skill in cache configuration will appreciate that the configurable cache described in connection with cache type memory may be equally applicable to other forms of memory. Other details, features, and advantages of configurable cache will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or another of the ored terms or more than one ored term.

"Memory" is a term that may include various data storage structures that may take many forms. In terms of speed of access, forms of memory may be placed broadly in a hierarchy with registers being a fast form of memory, followed by L1, or on chip cache, L2 or off chip cache, Random Access Memory, commonly referred to as RAM, secondary storage including hard drives, and remote secondary storage including storage that is accessible through a network. Cache, in its various forms, is an important part of many high speed processing operations.

Since caches have smaller access times than most forms of memory, it is important for system performance that the cache hit rate be maximized. The cache hit rate involves the frequency that addresses are found containing entries sought in the cache when a search is performed for those entries. Cache that provides high hit rates, however, generally requires higher access times, so that hit rates and access times may be balanced to optimize cache performance. Cache hit rate and access times are, moreover, in part a function of the behavior of the application or applications utilizing the cache and how the cache addresses are assigned. Thus, it may be beneficial to permit cache to be configurable to optimally suit various applications.

A higher level of associativity generally corresponds to a greater likelihood that desired data that is in the cache will be found but also generally requires a greater amount of access time, and an increase in the size of the cache when compared to caches having lesser levels of associativity. Thus, having fewer sets with more cache lines per set and higher associativity generally leads to more cache hits but requires more access time, while having more sets with fewer cache lines per set and lower associativity generally leads to fewer cache hits but requires less access time.

With regard to associativity, generally a more associative cache is more likely than a less associative cache to find information when that information is sought in the cache. When information is found, it is generally referred to as a hit and a hit ratio is the frequency that information is found. Moreover, more associative cache also generally requires more time and processing power to find information or make a hit than does less associative cache. Thus, it is desirable to configure cache in various ways for various applications depending on the difficulty of finding information in the cache and the need for speedy information retrieval.

Certain applications operate better using fully associative while other applications operate better using set associative cache and yet other applications operate better using direct mapped cache. Furthermore, a particular computing device utilizing cache, referred to herein as a node, may execute various applications so that it would be beneficial to reconfigure cache as fully associative, set associative, or direct mapped cache.

A cache that is configurable in hardware and that may be configured by either hardware or software may thus provide flexibility to suit the cache needs of various applications. Such a configurable cache may be configured for various degrees of associativity and various numbers of sets so that the cache may be configurable and repeatedly reconfigurable if desired from fully associative cache to direct mapped cache.

Attributes of cache memory include cache size, cache line size, a number of sets into which the cache is divided, associativity, and cache access time. Cache size is the total size of a cache memory system. Cache line size is the size, usually defined in number of bytes, of each cache line. Cache may furthermore be divided into sets of varying size or may not be divided into sets at all, which affects associativity of the cache and cache access time.

The following examples assume a byte addressable cache memory system. It should be recognized, however, that other configurations, including cache having multiple bytes per address or a single byte per line, may be utilized alternately. Those examples also assume a cache size of 64 bytes, a cache line size of 8 bytes, and a total of 8 bits in the address space of each line. The examples also assume that data is being retrieved from main memory and stored in the cache. It should be recognized, however, that any desired cache size, line size and number of bits in the address space of each line may be used in a configurable cache and that data may be drawn from memory devices other than main memory.

Figure 1:
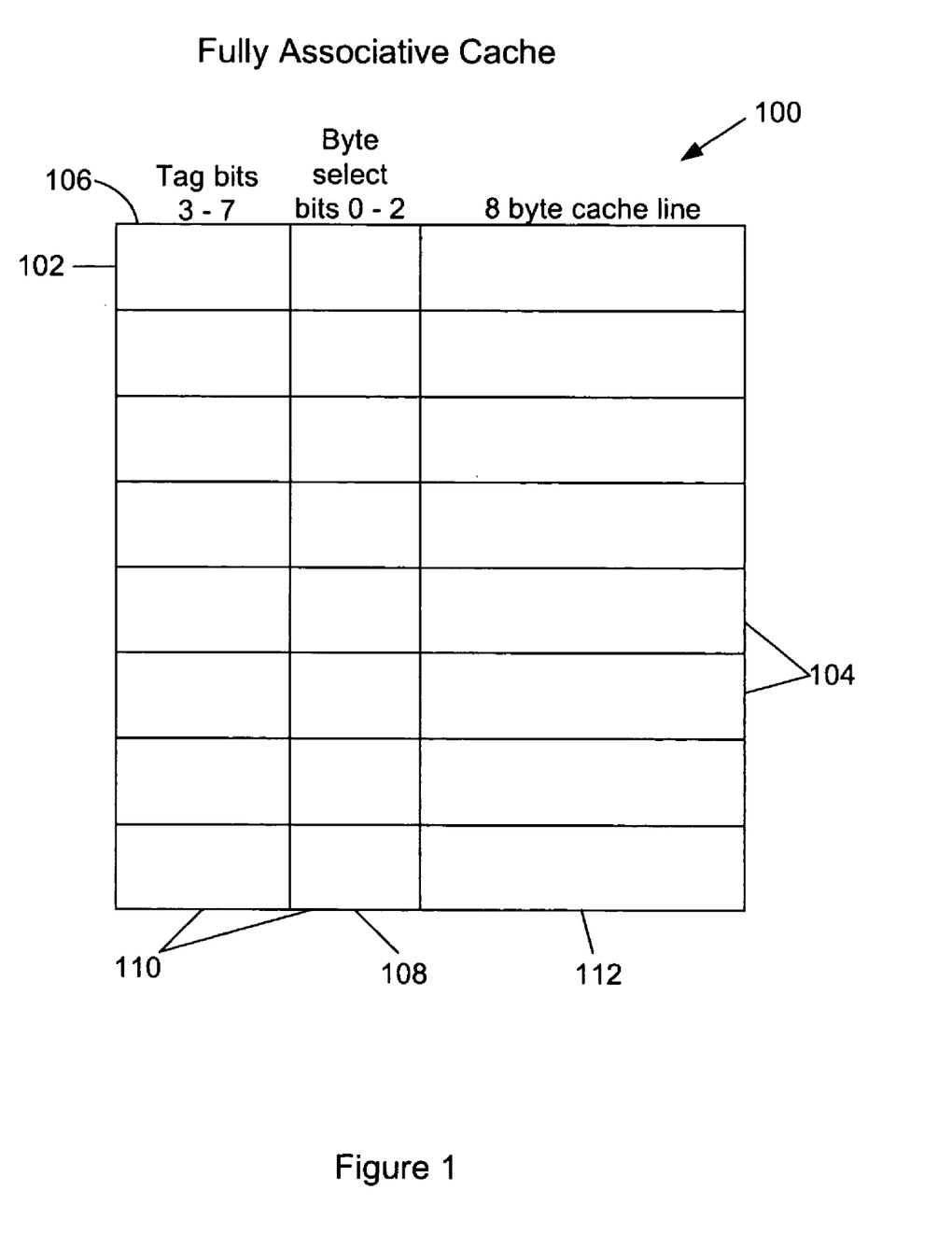
FIG. 1 illustrates an embodiment of a fully associative cache.

FIG. 1 illustrates an embodiment of a fully associative cache 100. Generally, a fully associative cache can store data in any cache location. The entire tag or address for the cache location, however, must be used in a search of the cache for desired data so that every addressable location in the cache may have to be searched to locate desired data in a fully associative cache.

The number of sets for a fully associative cache system is one. One or more set index bits are utilized to identify a set in which information is stored. Each set may, moreover, include one or more lines of information storage space and each line may include one or more information storage space. Therefore, no address bits are utilized as set index bits in the fully associative cache 100. The number of bits required to select a byte in a cache line, called byte select bits, is three, which is the minimum number of bits required to identify the eight different bytes in each cache line. The number of byte select bits required may be calculated by taking the $\log_2$ of the cache line size.

Figure 2:
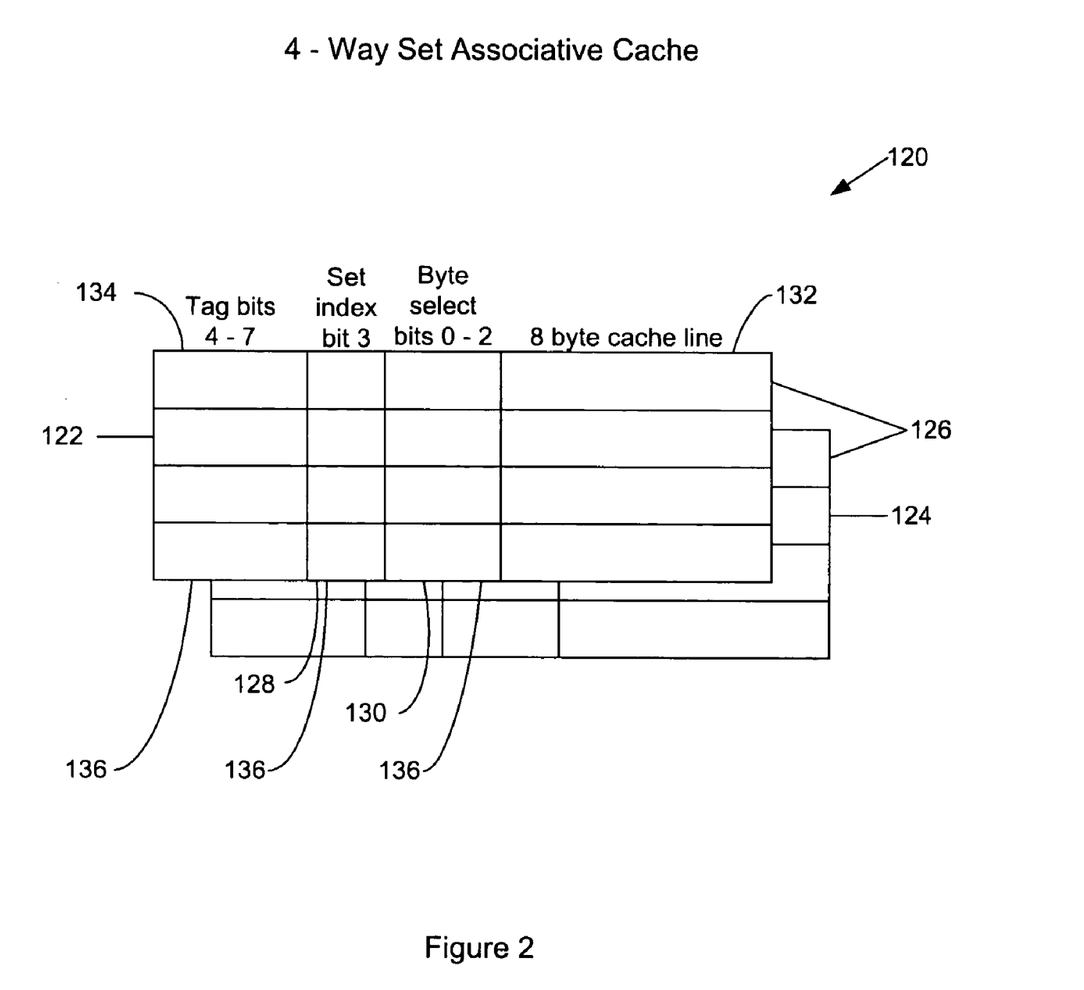
FIG. 2 illustrates an embodiment of a 4-way set associative cache.
Figure 3:
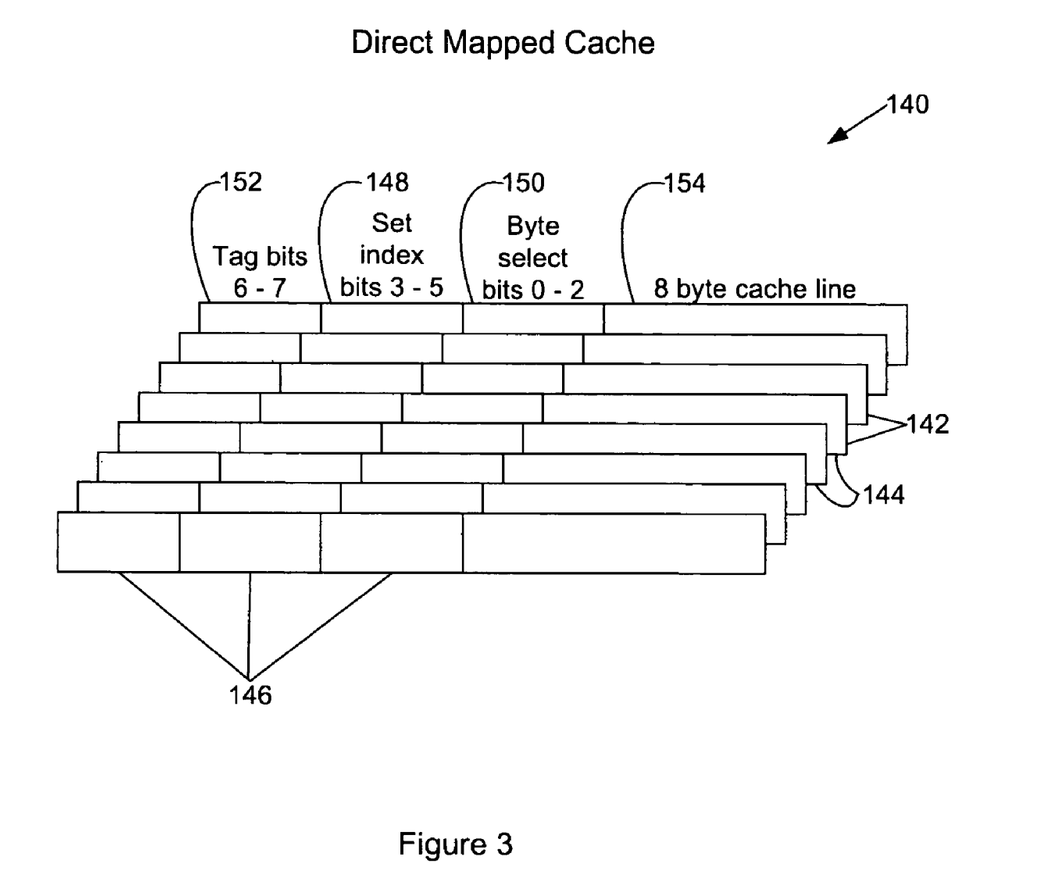
FIG. 3 illustrates an embodiment of a direct mapped cache.

The number of tag bits for any of the cache types illustrated in FIGS. 1–3 may be calculated by taking the total number of bits in the address (8 for FIG. 1) and subtracting from that total the number of set index bits (0 for FIG. 1), and the number of byte select bits (3 for FIG. 2). Tag bits identify which line within a set or within the cache where the cache only utilizes one set in which information is stored. The fully associative cache 100 of FIG. 1 has no set index bits because it is not divided into sets of cache lines 104, but has a single set 102 of cache lines 104. Thus, 5 tag bits are used in addresses in the fully associative cache 100 of FIG. 1. It should be recognized that the simplified fully associative cache 100 of FIG. 1 is provided for illustrative purposes and includes only eight cache lines. Moreover, those eight cache lines my be identified using fewer than five tag bits, but eight address bits are used in this example, allowing five tag bits.

Accordingly, each memory location address 110 of the fully associative cache 100 illustrated in FIG. 1 includes five tag bits 106 and three byte select bits 108, and each cache line 104 includes eight bytes of storage space 112 for storage of information.

FIG. 2 illustrates an embodiment of a 4-way set associative cache 120. Set associative cache divides the cache into two or more sets, each having two or more data storage locations, and is less associative than fully associative cache. With the set associative cache 120, each main memory address, and typically a plurality of main memory addresses, is mapped to one set in the cache and information retrieved from main memory to be stored in a set may be stored in any memory location in that set. Associativity is thus performed on a set by set basis in set associative cache.

The 4-way set associative cache 120 illustrated in FIG. 2 includes two sets 122 and 124 with four cache lines 126 in each set 122 and 124. Accordingly, the set associative cache 120 includes one set index bit 128 used to identify between the two sets 122 and 124 and three byte select bits 130 to select amongst eight bytes of data storage space 132 in each cache line 126. Using the equation provided in connection with FIG. 1, the number of tag bits 134 is equal to the total number of address bits 136 (8 bits) less the number of bits used as set index bits 128 (1 bit) and the number of bits used as byte select bits 130 (3 bits), which leaves four tag bits 134.

It should be noted with regard to FIG. 2, that in other embodiments, other numbers of sets may be used including, for example, a 2-way set associative cache that divides the cache into four sets having two cache lines each.

FIG. 3 illustrates an embodiment of a direct mapped cache 140. In the direct mapped cache 140, each cache line 142 is included in a different set 144 and is associated with a block of main memory. Multiple main memory storage locations may thus be directly mapped to each cache line such that information taken from a particular portion of main memory would be stored in a particular cache line. Thus, like with the set associative cache 120, each set of the direct mapped cache 140 may be mapped to a block of main memory and, because the direct mapped cache 140 provides more sets 144 than the set associative cache 120 given the same total cache size, smaller portions of main memory are typically mapped to each set 144 when utilizing the direct mapped cache 140. At least in part because of the quantity of sets 144 in the direct mapped cache 140, the direct mapped cache 140 generally provides faster access than set associative cache or fully associative cache and is less associative than set associative cache or fully associative cache.

The address 146 of the direct mapped cache 140 includes three set index bits 148 to identify the eight sets 144 in the direct mapped cache 140 and three byte select bits 150 to identify eight bytes of storage space 154 in each cache set 144. The direct mapped cache 140 includes two tag bits 152 in its address 144 because the address 146 includes eight total bits and six of those eight bits are used as set index bits 148 and byte select bits 150. It should be noted, however, that no tag bits may be necessary to identify information in the direct mapped cache 140, as the set index bits 148 identify data location down to a cache line 142 and the byte select bits 150 identify the byte of storage space 154 in which the information is located in the cache line 142.

Figure 4:
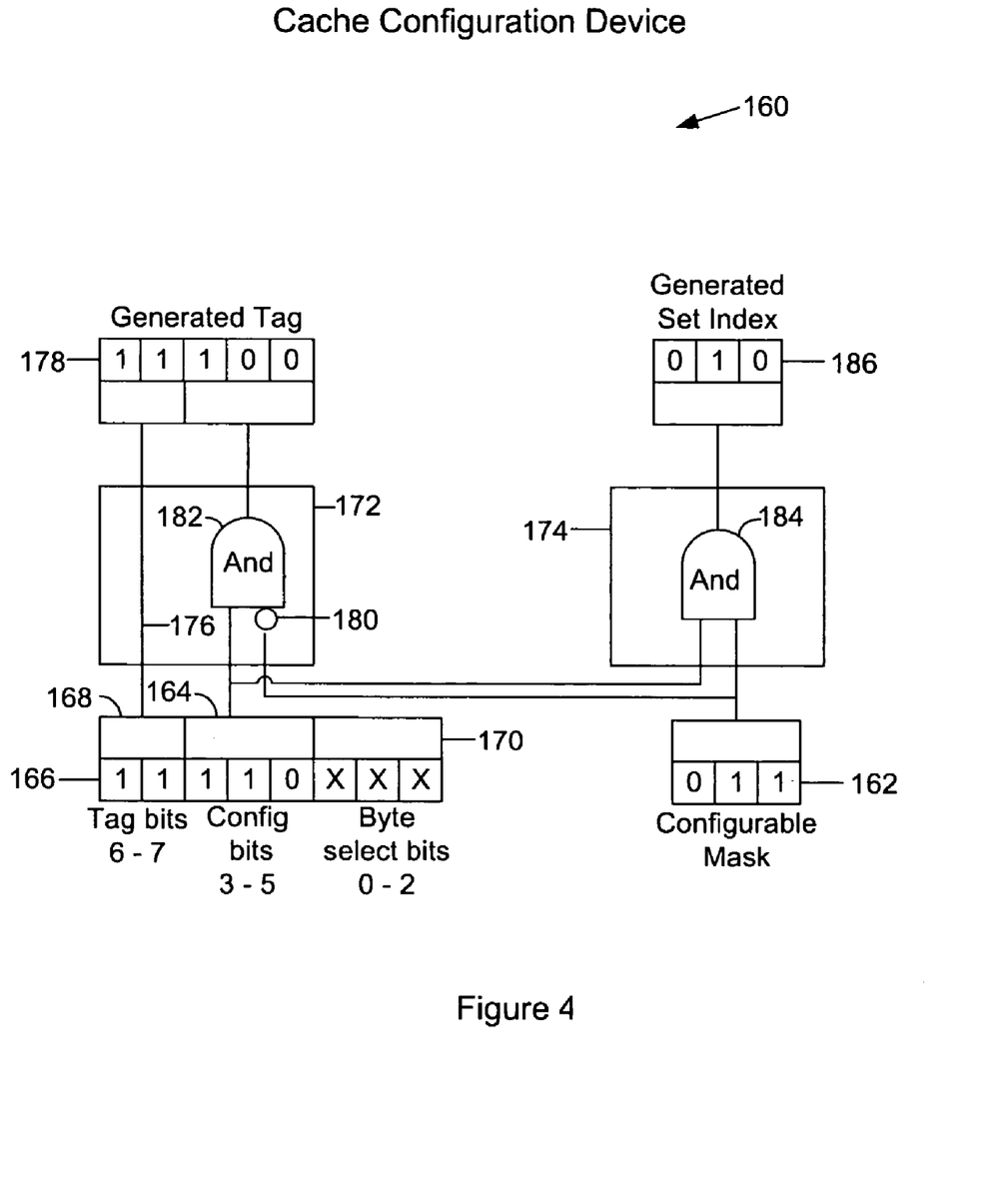
FIG. 4 illustrates an embodiment of a cache configuration device.

FIG. 4 illustrates a cache configuration device 160. The cache configuration device 160 may be formed on an integrated circuit or other hardware device and includes one or more configurable bits that may be configured, individually or together, as set index bits that define the number of sets used in the cache or tag bits that define the location of data within a set. As may be seen in the fully associative cache 100 of FIG. 1, where the configurable bits are configurable as either tag bits 106 or set index bits, all configurable bits may be configured as tag bits 106. Alternately, where the configurable bits are configurable as either tag bits 106 or set index bits, all bits may be configured as set index bits, as is illustrated in connection with the direct mapped cache 140 of FIG. 3 or, as is best illustrated in connection with the set associative cache 120, configurable bits may be configured as both set index bits 128 and tag bits 134.

The cache configuration device 160 may assign set index bits and byte select bits as necessary or desired for an application to utilize the cache and assign all remaining address bits to be tag bits to maximize the number of tag bits provided for any given configuration. A configuration mask may be provided to define the desired level of associativity by defining the configurable bits. Moreover, for a given cache size (CS) and a given cache line size (LS), the maximum number of configurable bits (CB) that may be configurable as either tag bits or set index bits may be calculated by the equation:

$$CB=\log_2(CS/LS).$$

The total number of configurations with different associativity that may be devised with that number of bits will then be CB+1. It should be noted that configurable cache may be formed wherein all tag bits and set index bits are configurable, which will be referred to as fully configurable associativity, or wherein only a portion of bits are configurable as either tag bits or set index bits, which will be referred to as partially configurable. Thus, the maximum number of configurable address bits available after byte select bits have been established may be determined by the equation:

$$CB=AB-\log_2 LS;$$

where:

AB is the total number of address bits available; and $\log_2(LS)$ is the number of bits needed as byte select bits.

Thus, for example, in a 64 byte cache having eight bytes per cache line, if the total number of address bits is eight and the cache is byte addressable (as illustrated in the caches of FIGS. 1–3), then the maximum number of bits that are necessary as tag bits and set index bits, which is also the number of bits that may be configurable, is 8–$\log_2(8)$, or 3, which is equal to five and the number of possible configurations is four. Three of the four configurations are illustrated in FIGS. 1–3.

The configurable cache may be made configurable by including a configurable mask with the cache. Many forms of configurable mask may be employed to configure address bits as either tag bits or set index bits. FIG. 4 illustrates one embodiment of such a configurable mask in the form of the cache configuration device 160 that sets configurable mask registers.

The cache configuration device 160 thus includes a configurable mask 162 containing three bits that correspond to three configurable bits 164 in each address 166 of the cache. The address in this embodiment also includes two fixed tag bits 168 and three byte select bits 170 that are not configurable. As has been noted, any number of address bits 166 may be configurable, however, in the cache configuration device 160 embodiment illustrated in FIG. 4, three bits have been made configurable.

The logic utilized by the cache configuration device 160 includes a tag generation logic block 172 and a set index generation logic block 174. The tag generation logic block 172 includes a pass through 176 that passes the values in the tag bits 168 to a generated tag 178. The tag generation logic block 172 also includes an inverter 180 and an and gate 182. The inverter 180 takes the logical inverse of each bit of the configurable mask 162 and the and gate 182 ands the inverse of each bit of the configurable mask 162 with each configurable bit 164 to arrive at the last three bits of the generated tag 178. Thus in the example provided in FIG. 4, the leftmost bit of the configurable mask 162, having a value of 0, is inverted to a one at 180 and anded at 182 to the leftmost bit of the configurable bits 164, having a value of 1, to arrive at the value of 1 in the third bit of the generated tag 178. Similarly, the 1 in the center bit of the configurable mask 162 is inverted and anded with the 1 in the center bit of the configurable bits 164 to arrive at the 0 in the fourth bit of the generated tag 178, and the 1 in the rightmost bit of the configurable mask 162 is inverted and anded with the 0 in the rightmost bit of the configurable bits 164 to arrive at the 0 in the fifth bit of the generated tag 178.

The set index generation logic block 174 includes an and gate 184 that ands each bit of the configurable mask 162 with each configurable bit 164 to arrive at the generated set index 186. Thus in the example provided in FIG. 4, the leftmost bit of the configurable mask 162, having a value of 0, is anded at 184 to the leftmost bit of the configurable bits 164, having a value of 1, to arrive at the value of 0 in the leftmost bit of the generated set index 186. Similarly, the 1 in the center bit of the configurable mask 162 is anded at 184 to the center bit of the configurable bits 164, having a value of 1, to arrive at the value of 1 in the center bit of the generated set index 186, and the 1 in the rightmost bit of the configurable mask 162 is anded at 184 to the rightmost bit of the configurable bits 164, having a value of 0, to arrive at the value of 0 in the center bit of the generated set index 186.

As may be seen by following the tag generation logic and set index generation logic, if three zeros are entered in the configurable mask 162, there will be three tag bits and no set index bits. If a one is placed in the rightmost bit of the configurable mask 162, and zeros are placed in the other bits of the configurable mask 162, there will be two tag bits and one set index bit. If a one is placed in the two rightmost bits of the configurable mask 162, and a zero is placed in the leftmost bit of the configurable mask 162, there will be one tag bit and two set index bits. If ones are placed in al of the bits of the configurable mask 162, there will be three tag bits and no set index bits. Thus, a one may be placed in the rightmost bit of the configurable mask 162 to indicate one set index bit and additional ones may be placed sequentially to the left of the rightmost bit to indicate additional set index bits.

Other embodiments may be developed that modify the configurable bits in other ways including, for example, by use of memory other than registers, by use of jumpers, or by simply setting the use of each bit with a single command. Moreover, the bits may be configured either by software or hardware, as preferred by the manufacturer or user.

Where the cache is byte selectable, byte select bits may be fixed and not configurable, as is illustrated in the cache configuration device 160 of FIG. 4. Alternately, where it is desired to configure byte selection per cache line, the byte select bits may also be configurable as either byte select bits, index set bits, or tag bits. In other cache, it may be desirable not to have the cache be byte selectable and no byte select bits may be included in the cache.

In the cache configuration device 160 of FIG. 4, bits 6 and 7 are preset as tag bits and are not configurable, while bits 3–5 are configurable as either tag bits or set index bits and bits 0–2 are preset as byte select bits. Thus the cache configuration device 160 is an example of cache having partially configurable associativity because not all of the bits are configurable.

Reading the value in the configurable mask as a binary value, the total number of sets (S) is equal to the binary value of the configurable mask+1. Thus, the binary value 011 is incident in the configurable mask 162 of FIG. 4, which is three in decimal notation, so that four sets may be utilized in that illustrated embodiment. Moreover, the number of ways the cache is associative per set (W) may be calculated by the equation W=CS/(LS*S) so that the associativity of the cache created by the example illustrated in FIG. 4, having a cache size (CS) of 64 bytes and a line size (LS) of eight bytes, is 64 divided by the quantity of eight times four, or two.

Once the tag and set index is generated for a given address using the configurable mask 162, the set may be reached using the set index and the number of configured sets and ways associative and the tag may be compared against the tags for the ways associated with that set.

To reconfigure a configurable cache, the cache would generally be flushed and all entries in the cache would generally be invalidated because any information stored in one configuration and sought in another configuration would typically not be stored in the same address in which it was stored. Flushing in this context may indicate simply invalidating information stored in the cache and may be performed, for example, by setting one or more validation bits to indicate the contents of the cache are not valid. For example, a validation bit may be associated with each line of cache and that validation bit may be set to a one or true to indicate that valid data exists somewhere in the cache line or the validation bit may be set to zero or false to indicate that no valid data exists in that line of cache. When flushing cache having such a validation bit arrangement, all validation bits may be set to zero or false to indicate that there is no valid data in any of the lines of cache. After the cache is reconfigured, the cache lines may again be filled with valid information and the validation bits for each cache line containing valid information may be reset to one or true.

The cache configuration device 160 of FIG. 4 may be integrated into L1 or L2 type cache or may alternately be a form of memory other than cache including, for example, registers or RAM.

Figure 5:
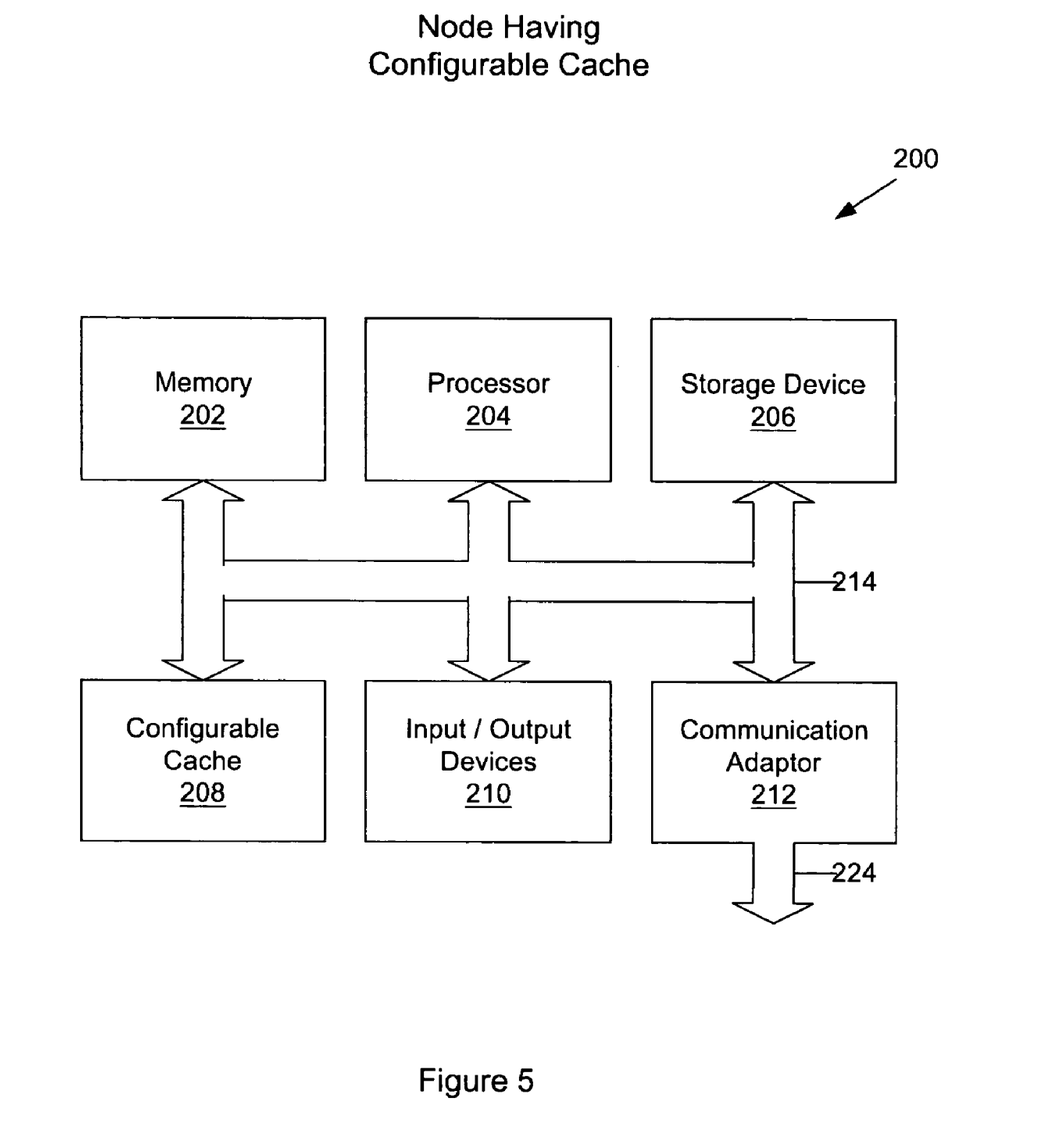
FIG. 5 illustrates an embodiment of a node having configurable cache.

FIG. 5 illustrates an embodiment of a node 200 incorporating a configurable cache 208. The node 200 also includes memory 202, a processor 204, a storage device 206, input and output devices 210, and a communication adaptor 212. Communication between the memory 202 the processor 204, the storage device 206, the configurable cache 208, the input and output devices 210, and the communication adaptor 212 may be accomplished by way of one or more communication busses 214. Those busses 214 may include, for example, a system bus, a peripheral component interface bus, and an industry standard architecture bus.

It should be recognized that any or all of the components 202–212 of the node 200 may be implemented in a single machine. For example, the configurable cache 208 and processor 204 might be combined in a state machine or other hardware based logic machine or may be combined on a single chip or board within the node.

The memory 202 may, for example, include random access memory (RAM), dynamic RAM, and/or read only memory (ROM) (e.g., programmable ROM, erasable programmable ROM, or electronically erasable programmable ROM) and may store computer program instructions and information.

The processor 204 may execute the program instructions and process the data stored in the memory 202 and the configurable cache 208. In one embodiment, the instructions are stored in a compressed and/or encrypted format. As used herein the phrase, "executed by a processor" is intended to encompass instructions stored in a compressed and/or encrypted format, as well as instructions that may be compiled or installed by an installer before being executed by the processor 204.

The storage device 206 may, for example, be a magnetic disk (e.g., floppy disk and hard drive), optical disk (e.g., CD-ROM) or any other device or signal that can store digital information. The communication adaptor 212 permits communication between the node 200 and other devices or nodes coupled to the communication adaptor 212 at the communication adaptor port 224. The network may be a variety of networks including the network 250 illustrated in FIG. 6. It will be recognized that the node 200 may alternately or in addition be coupled directly to one or more other devices through one or more input/output adaptors (not shown).

The node 200 may also be coupled to input or output devices 210 such as, for example, a monitor or printer and a keyboard or mouse (not shown). It will be recognized, however, that the node 200 does not necessarily need to have any or all of those input and output devices 210 to operate. Moreover, other components of the node 200 may not be necessary for operation of the node 200. For example, the storage device 206 may not be necessary for operation of the node 200 as all information referred to by the node 200 may, for example, be held in memory 202 and the configurable cache 208.

A network in which a node, such as the node 200 of FIG. 5, incorporating configurable cache, such as the cache 208 of FIG. 5, may be implemented may be a network of nodes. The nodes in that network may include computers, telephones, or other, typically processor-based, devices interconnected by one or more forms of communication media. The communication media coupling those devices may include, for example, twisted pair, co-axial cable, optical fibers and wireless communication methods such as use of radio frequencies. A node having configurable cache may, for example, receive data to be stored in the configurable cache from another node coupled to a Public Switched Telephone Network (PSTN), a Private Branch Exchange (PBX), the Internet, a Local Area Network (LAN), a Wide Area Network (WAN), or another network, such as, for example, the network 252 shown in connection with the system 250 illustrated in FIG. 6.

Figure 6:
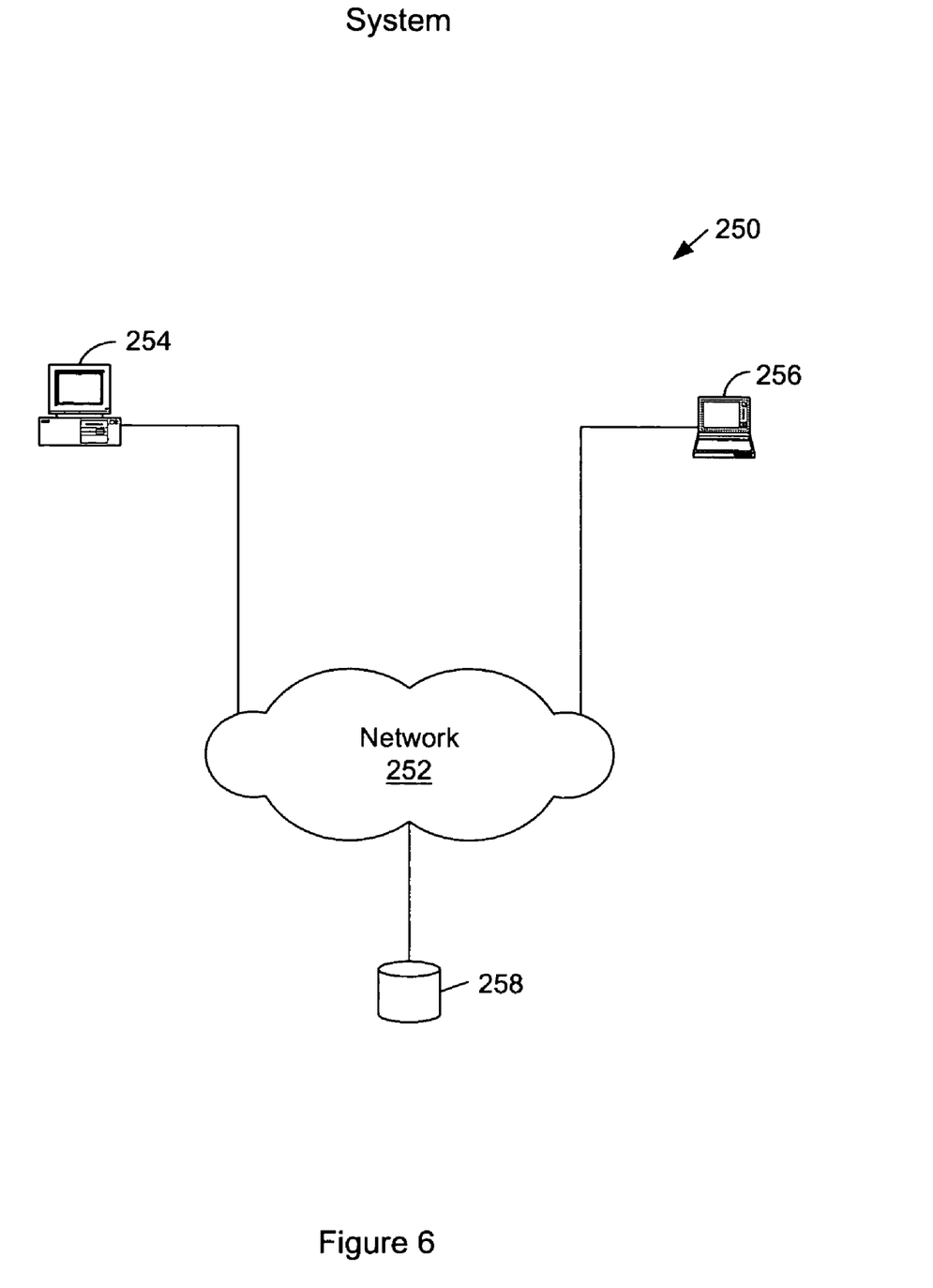
FIG. 6 illustrates an embodiment of a system in which configurable cache may be utilized.

FIG. 6 illustrates an embodiment of the system 250 in which a node having configurable cache may operate. The system 250 may include the network 252, and one or more nodes 254 and 256 receiving information from a networked data storage device 258 coupled to the network 252. That information may furthermore be cached at one or more of the nodes 254 and 256 in a configurable cache system.

While the systems, apparatuses, and methods of configurable cache have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A system comprising,
   a configurable mask;
   an AND gate; and
   a cache having one or more configurable bits that are configurable to identify one or more sets having at least one line of information storage and a tag to identify a line of information storage, wherein the configurable bits are ANDed to the configurable mask.

2. The system of claim 1, wherein the number of sets is equal to the binary value of the configurable mask plus one.

3. The system of claim 1. wherein the configurable bits are set index bits when configured to identify the set having at least one line of information storage and the configurable bits are tag bits when configured to identify the line of information storage.

4. The system of claim 3, wherein the cache includes a plurality of lines of information storage and each line of information storage includes at least one set index bit.

5. The system of claim 4 wherein the lines of data storage include no tag bits.

6. The system of claim 3, wherein the cache includes a plurality of lines of information storage and each line of information storage includes at least one tag bit.

7. The system of claim 6, wherein the lines of data storage include no set index bits.

8. The system of claim 3, wherein the configurable bits are configured as tag bits and reconfigured as set index bits.

9. The system of claim 8, wherein all entries in the cache are invalidated prior to reconfiguring the configurable bits so that no address holds valid data prior to the configurable bits being reconfigured as set index bits.

10. The system of claim 3, wherein the configurable bits are configured as set index bits and reconfigured as tag bits.

11. The system of claim 10, wherein all entries in the cache are invalidated prior to reconfiguring the configurable bits so that no address holds valid data prior to the configurable bits being reconfigured as tag bits.

12. A method of configuring cache formed on an integrated circuit comprising,
associating one or more bits as configurable bits that are configurable to identify one or more sets having at least one line of information storage and a tag to identify a line of information storage; and
ANDing the configurable bits to a configurable mask.

13. The method of claim 12, wherein the number of sets is equal to the binary value of the configurable mask plus one.

14. The method of claim 12, wherein the configurable bits are configurable through software.

15. The method of claim 12, wherein the cache includes a plurality of cache lines.

16. The method of claim 12, wherein the configurable bit is reconfigurable from a tag bit to a set index bit.

17. The cache of claim 12, wherein the bits are reconfigurable from set index bits to tag bits.

18. A node, comprising:
an AND gate;
a configurable mask;
a processor; and
cache formed on an integrated circuit coupled to the processor to store information for retrieval by the processor, the cache having one or more configurable bits that are configurable as one or more set index bits and one or more tag bits, wherein the configurable bits are ANDed to the configurable mask.

19. The node of claim 18, wherein the cache includes a plurality of lines of information storage, further comprising one or more configurable bits that are configurable as tag bits and set index bits in each line of the cache.

20. The node of claim 18, wherein the configurable bits are reconfigurable from tag bits to set index bits.

21. The node of claim 18, wherein the configurable bits are reconfigurable from set index bits to tag bits.

22. A method of configuring cache formed on a integrated circuit and having a plurality of address bits, comprising
setting at least one of the cache address bits as one of a tag bit and a set index bit; and
ANDing the configurable bits to a configurable mask,
wherein the cache includes a plurality of lines and each line includes the plurality of address bits.

23. The method of claim 22, wherein the cache includes a plurality of information storage locations identified by the address bits, further comprising:
setting at least one of the cache address bits as a tag bit;
placing information in at least one of the information storage locations;
invalidating information in all information storage locations in the cache; and
reconfiguring the bit from a tag bit to a set index bit.

24. The method of claim 22, wherein the cache includes a plurality of information storage locations identified by the address bits, further comprising:
setting at least one of the cache address bits as a set index bit;
placing information in at least one of the information storage locations;
invalidating information in all information storage locations in the cache; and
reconfiguring the bit from a set index bit to a tag bit.

25. An article of manufacture comprising:
a computer readable medium having stored thereon instructions which, when executed by a processor, cause the processor to
associate one or more bits as configurable bits that are configurable to identify one or more sets having at least one line of information storage and a tag to identify a line of information storage; and
AND the configurable bits to a configurable mask, wherein the number of sets is equal to the binary value of the configurable mask plus one.

26. The article of manufacture of claim 25, wherein the cache includes a plurality of lines and each line includes a plurality of address bits, further comprising setting at least one of the cache address bits in each line of cache as one of a tag bit and a set index bit.

* * * * *